$Co^{++} = 0.1$ mol/liter

INVENTORS
Osamu Suzuki
Masao Takahashi
Tomio Fukunaga
Jun Kuboyama

United States Patent Office 3,399,966
Patented Sept. 3, 1968

3,399,966
NOVEL COBALT OXIDE AND AN ELECTRODE HAVING THE COBALT OXIDE COATING
Osamu Suzuki, Masao Takahashi, Tomio Fukunaga, and Jun Kuboyama, Yokohama, Japan, assignors to Trurumi Soda Company Limited, Yokohama, Japan, a corporation of Japan
Filed May 18, 1965, Ser. No. 456,638
Claims priority, application Japan, May 18, 1964, 39/27,642
12 Claims. (Cl. 23—183)

ABSTRACT OF THE DISCLOSURE

A cobalt oxide having a general formula $CoO_m \cdot nH_2O$ wherein $m$ is from 1.4 to 1.7 and $n$ is from 0.1 to 1. This cobalt oxide is prepared by anodic oxidation of water soluble salts or cobalt. Also electrodes bearing a coating of said cobalt oxide. Such electrodes are insoluble and are useful in electrolysis.

---

This invention relates to a novel cobalt oxide and the process for preparing such novel cobalt oxide compound. It further relates to an electrode having the novel oxide of cobalt deposited thereon by anodic oxidation; this electrode is insoluble and can be used in electrolysis.

The object of the present invention is to provide a novel oxide of cobalt which is featured by the fact that it is represented by the formula—

$$CoO_m \cdot nH_2O$$

wherein $m$ is from 1.4 to 1.7 and $n$ is from 0.1 to 1. The X-ray analysis of the oxide of cobalt give the results as seen in Table 3, and conventional oxides of cobalt are given for comparison. The present cobalt oxide gives the pH-potential curve (referring to normal hydrogen electrode) shown by C in FIG. 3.

Figure 2:
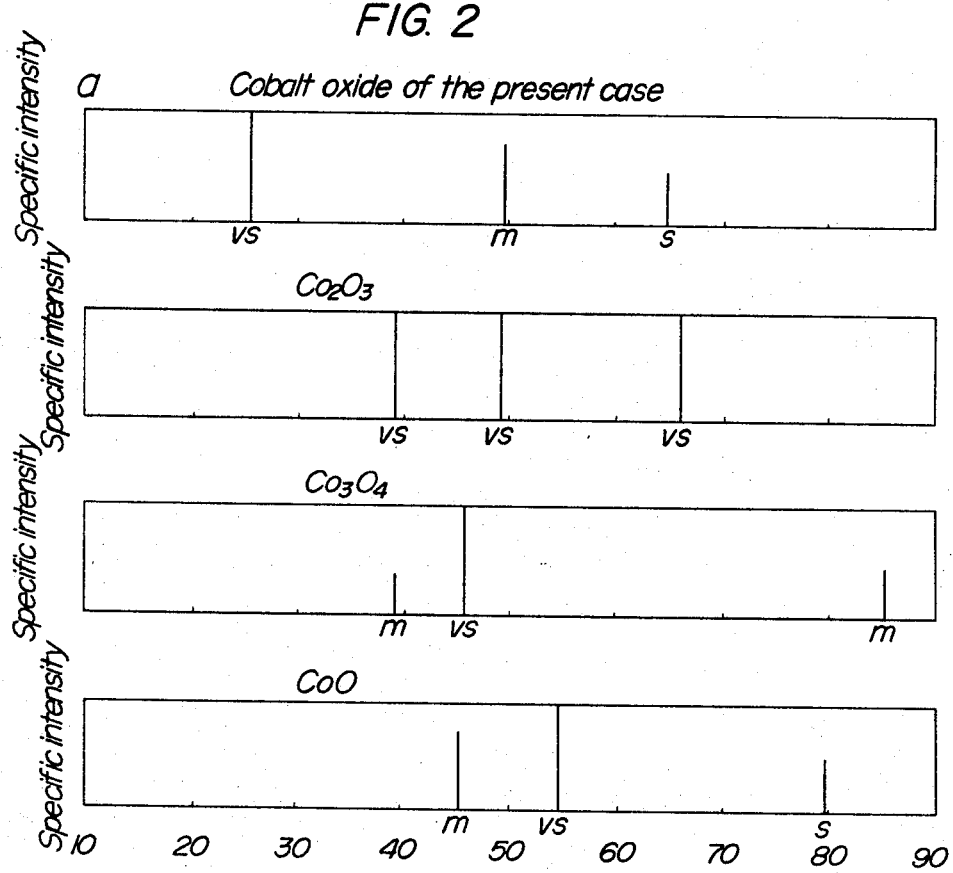

The crystal structure of the present cobalt oxide, which is the basis of the present invention, is yet to be undertaken for research. The oxides such as CoO, $Co_3O_4$ and $Co_2O_3$ are known, but the cobalt oxide prepared by the present invention is distinctly different from the above conventional compounds and this may be seen from the X-ray diffraction patterns of FIG. 2, wherein the compounds for comparison were quoted from ASTM cards. On the other hand, the structure of the present cobalt oxide resembles that of CoO(OH) (basic cobalt oxide) or $CoHO_2$ (cobaltic hydroxide) but they are not similar. The lattice distances of the above three compounds are given in Table 3.

TABLE 3.—LATTICE DISTANCES OF COBALT OXIDE PREPARED BY THE PRESENT INVENTION AND COMPARISONS (d. in A.)

[vs.=very strong; s.=strong; m.=medium]

| Cobalt oxide of the present invention | CoO(OH) (basic cobalt oxide) | $CoHO_2$ (cobaltic hydroxide) |
|---|---|---|
| vs. 4.45 | vs. 4.55 | vs. 4.38 |
| s. 2.32 | s. 2.36 | s. 2.31 |
| m. 1.81 | m. 1.84 | m. 1.98 |

| CoO (divalent cobalt oxide) | $Co_2O_3$ (trivalent cobalt oxide) | $Co_3O_4$ (sequi cobalt oxide) |
|---|---|---|
| vs. 2.13 | vs. 2.87 | vs. 2.44 |
| s. 2.46 | vs. 2.33 | m. 1.43 |
| m. 1.51 | vs. 1.78 | m. 2.86 |

Figure 3:
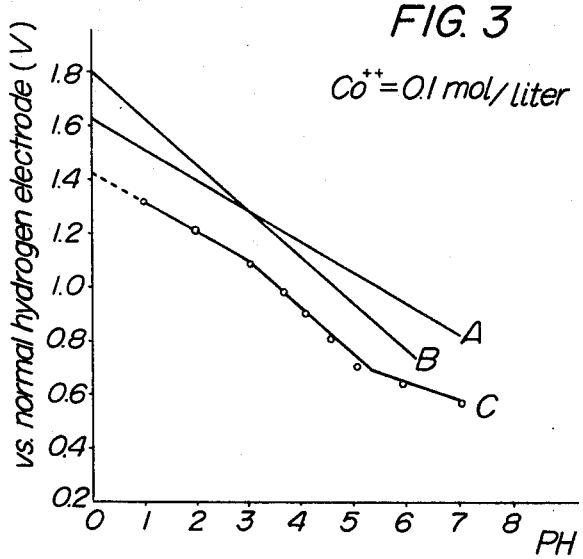

Further, comparison with cobalt oxides of $CoO_2$ (A) and $Co_2O_3$ (B) can be seen in FIG. 3 with respect to normal hydrogen electrode and pH.

When cobalt oxide of the present invention is dipped in the solution containing $Co^{++}$ and its potential determined, chemical potential of the present cobalt oxide can be suggested thereby. The results are shown in FIG. 3. The present cobalt oxide is dipped in several 0.1 mol test solutions of cobaltous ion of pH 1–7 and their potentials were determined vs. saturated calomel electrode. The determined potentials are expressed with reference to normal hydrogen electrode in FIG. 3 with pH of the solution in abscissa and the determined potential (vs./normal hydrogen electrode) in ordinate. Change of potential per pH 1 is about 120 mv. in the range of pH=0–3, 180 mv. in pH=3–5 and 60 mv. in pH=5–7. Curve A indicates calculated values of $CoO_2$ and curve B indicates those of $Co_2O_3$ as compared with the measured values of the present cobalt oxide indicated by curve C.

A method for preparing the cobalt oxide of the present invention comprises anode-oxidizing a solution of water soluble salts of cobalt, whose discharging potential is not more than 0.7 volt referring to saturated calomel electrode, under current density of not more than 1 ampere/dm.² and from 0.7 to 1.4 volts, said solution having a pH of from 1 to 7, preferably from 2 to 6.

Conventionally, the known insoluble electrodes for the electrolysis of aqueous solutions are usually noble metals such as platinum, which is quite costly and not insoluble under certain conditions, namely, it is not a perfectly insoluble electrode material. Some improvements have been made to overcome the disadvantages, that is, by electrodes coated with novel metal such as platinum, titanium, tantalum, zirconium, etc., but their cost is still not sufficiently low. Magnetite electrodes, lead peroxide electrodes, and the like, have been developed; the former has high electrical resistance while the latter has high overvoltage as an anode which is disadvantageous for application to other electrolytic oxidation requiring higher oxidation potential. Economically, the latter is not a sufficient insoluble anode and its use is therefore limited in the range of application.

Figure 1:
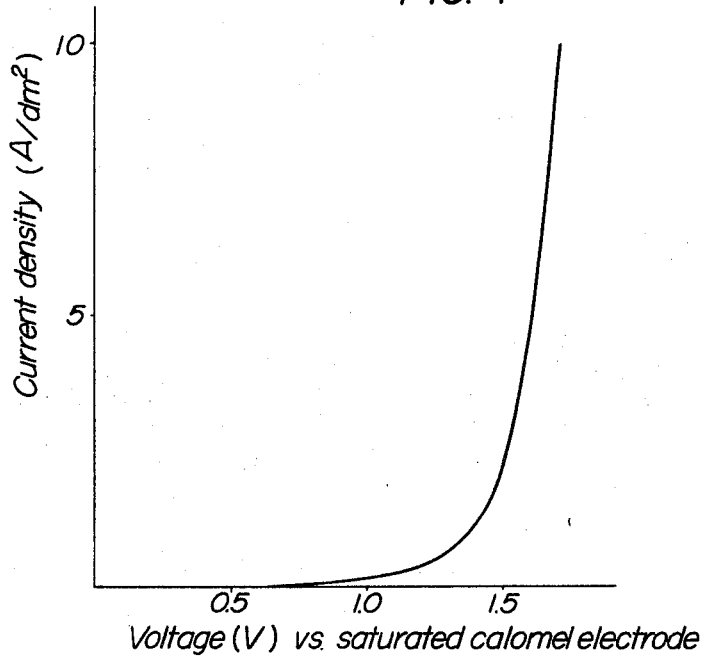

A method of forming the cobalt oxide as a film on the surface of platinum in 1 mol solution of cobalt salts such as cobaltous nitrate, is given below:

FIG. 1 shows current-voltage curve of electrolysis at 60° C. in 1 mol solution of cobaltous nitrate of pH 5.0, using platinum as anode and stainless steel as cathode. It is shown in the figure that electrode reaction does not occur, with almost no current, when anode potential is lower than +0.7 v. (vs. saturated calomel electrode).

When the potential is higher than +0.7 v., the current gradually increases to +1.4 v. and black oxide is deposited on the surface of platinum in this range of potential. This oxide is the film of cobalt oxide in this invention. Moreover, when the potential is higher than +1.5 v., oxygen evolved violently. As mentioned above, it is known that the condition for the formation of cobalt oxide electrode is optimum above +0.7 v. and desirably in the range of +0.7 v. — +1.4 v., considering the secondary reaction of oxygen evolution. If the range is expressed in current density, it is optimum in lower than 1 amp./dm.² and desirably at about 0.3 amp/dm.² These conditions are identical in other salts, i.e. any water soluble cobalt salts. The salts having amine evolving oxygen such as nitrate, sulfate, acetate, fluoborate, etc. are adequate, but cobalt oxide is difficult to be electrodeposited from iodide or bromide having discharge potential lower than +0.7 v.

As chlorine-evolving potential of chloride is +1.1 v. (vs. saturated calomel electrode), the evolution of chlorine predominantly happens with the electrodeposition of cobalt oxide, and compact cobalt anode cannot be obtained with compact crystal structure, which indicates that chloride is not adequate for this purpose. When any adequate cobalt salt was used for electrolyte, its concentration may be as large as possible; however it is required to be as high as from 0.001 mol/liter to saturated state and if it is lower, current efficiency is not good and uniform film cannot be obtained. The electrolysis may be conducted at room temperature, but is better at higher temperatures which is at 20–80° C. in general. The pH of electrolyte, in this case, must be within 6~2 which is neutral~acidic which prevents it from the precipitation of cobalt salts. The change of concentration, temperature, and pH in these ranges have almost no effects on the above optimum potential or current density.

The film can be obtained thicker when the period of electrolysis is longer and the concentration of salts is larger; however, the period of electrolysis may be from 1 hour to several days.

Base materials for coating of cobalt oxide are as follows:

(a) Graphite.
(b) Titanium, tantalum, platinum, zirconium, tungsten, lead, and their alloys.
(c) Iron, nickel, cobalt, and their alloys.
(d) These materials consisting of porcelain, the surface of which is coated with electro-conductive substances such as that of above (a), (b) and (c).
(e) Other materials consisting of electro-conductive substances coated with other electro-conductive substances such as that of above (b) and (c).

The anode obtained by the above process has much higher corrosion resistance than that of lead peroxide, platinum, magnetite, etc. The higher resistance may be caused by the fact it is always used as an electrode and the oxide is always placed in the oxidizable surroundings.

The anode of deposited CoO is not perfectly insoluble in a solution with pH under 1 containing bromide, iodide, or other anions having discharge potential of under $+0.7$ v.; however, it is perfectly insoluble in the solutions of pH above 1 containing chloride, sulfate, nitrate, or the like. Then, it is most effective for the electrolysis of sodium chloride, chlorate, or the like.

Low overvoltage is shown in Tables 1 and 2 by chlorine-evolving potential and oxygen-evolving potential by comparison with conventional electrodes.

TABLE 1.—CHLORINE-EVOLVING POTENTIAL (ANODE POTENTIAL V vs. SATURATED CALOMEL ELECTRODE) IN NaCl 300 G./LITER SOLUTION AT CURRENT DENSITY 10 AMP/DM².

| Temperature (° C.) | Cobalt Oxide electrode (v.) | Graphite electrode (v.) | Platinum electrode (v.) | Lead Peroxide (PbO₂) electrode (v.) |
|---|---|---|---|---|
| 20 | 1.16 | 1.38 | [1] 1.72 | 1.80 |
| 70 | 1.12 | 1.27 | 1.55 | 1.66 |

[1] It was 1.19 v. (20° C.) or 1.15 v. (70° C.) in the initial period, but the value was determined in steady state after several hours.

TABLE 2.—OXYGEN-EVOLVING POTENTIAL (ANODE POTENTIAL VS. SATURATED CALOMEL ELECTRODE) In 1 N—K₂SO₄ SOLUTION AT 10 AMP/DM.² AND 25° C.

|   | V. |
|---|---|
| Cobalt oxide electrode | 1.43 |
| Nickel electrode | 1.57 |
| Platinum electrode | 2.08 |
| Lead peroxide (PbO₂) electrode | 1.92 |

As shown in Tables 1 and 2, overvoltage of chlorine or oxygen is the lowest as compared with the conventionally known electrodes and an electrode capable of such low overvoltage has not been known. It is shown in Table 1 that cobalt oxide electrode prepared by the present invention has the lowest temperature coefficient of overvoltgae and smaller activation energy as compared with other electrodes, which is in part indicating the above low overvoltage. Furthermore, the present invention is characterized by that when the coated graphite electrode is used for electrolysis under the conditions of Table 1 (NaCl 300 g./liter 10 amp/dm.², and 70° C.), the potential of cobalt oxide electrode is still 1.12 v., even if the film is partly peeled off, and the current density of graphite corresponding to the above potential is 0.5 amp/dm.²; then, the current density of graphite is merely ½₀ times as that of cobalt oxide and the exposed graphite has almost no electrochemical consumption. Accordingly, it is one of the very great advantages of the present invention that in the electrolysis of sodium chloride with conventional graphite electrode, the electrode can be replaced by the same graphite electrode coated with cobalt oxide film prepared by the present invention for very effective use.

The base materials of cobalt oxide electrode according to this invention are divided by uses as follows: Graphite, platinum, titanium, lead, and their alloys or other electro-conductive materials coated with the above substances can be used for the electrolysis of sodium chloride or chlorates. Those materials consisting of porcelain, the surface of which is coated with electro-conductive materials and in addition, coated with cobalt oxide, or those materials formed by the present cobalt oxide with suitable fillers can also be used for the above purpose. Moreover, for anode in electrolysis of alkaline solution (such as electrolysis of water), iron, nickel, and their alloys or other electro-conductive materials coated with the above substances can be used for base materials.

The present invention will be explained in the following examples and it is to be understood that the values of various conditions can be varied within the limits of this invention without departing from the spirit and scope thereof.

EXAMPLE 1

Anodic oxidation was performed on graphite plate (3.8 x 18 x 42 cm.) in 1 mol cobaltous nitrate solution under the conditions of 60° C., pH 4–5 and 0.3 amp/dm.² for 10 hrs. and an electrode, of which surface being coated with cobalt oxide film was obtained.

The above electrode was settled in Allen-Moore ML Type diaphragm system cell (having 24 pieces of electrolytic plates) and the operation was performed. The results are shown in Table 4 for reference.

TABLE 4.—PROCESS OF OPERATION IN ALLEN-MOORE ML TYPE ELECTROLYTIC CELL

| Days elapsed | Current (amp) | Potential (v.) of cobalt oxide electrolytic cell | Potential (v.) of graphite electrolytic cell |
|---|---|---|---|
| 10 | 2,000 | 3.12 | 3.30 |
| 30 | 2,000 | 3.13 | 3.28 |
| 50 | 2,000 | 3.15 | 3.32 |
| 70 | 2,000 | 3.14 | 3.35 |
| 90 | 2,000 | 3.17 | 3.40 |
| 120 | 2,000 | 3.17 | 3.45 |

EXAMPLE 2

Anodic oxidation was performed on platinum plate (10 x 1 x 50 mm.) in 0.5 mol cobaltous sulfate solution under the conditions of 70° C., pH 4–5 and 0.8 amp/dm.² for 8 hours and its surface was coated with cobalt oxide film. As the result, the surface was coated with very good film of cobalt oxide.

Chlorine-evolving and oxygen-evolving potentials of the above electrode were determined and the results are shown in the following Table 5.

TABLE 5.—CHLORINE-EVOLVING AND OXYGEN-EVOLVING POTENTIALS

70° C. 10 amp/dm.² (v.):
  Chlorine-evolving potential (vs. saturated calomel electrode) _____ 1.12
  Oxygen-evolving potential (vs. saturated calomel electrode) _____ 1.42

What is claimed is:

1. A cobalt oxide having the general formula of $$CoO_m \cdot nH_2O$$

wherein $m$ is from 1.4 to 1.7 and $n$ is from 0.1 to 1, and having X-ray analysis values shown in FIG. 2a and further having a pH-potential (normal hydrogen electrode) curve shown by C in FIG. 3.

2. A method for preparing a cobalt oxide having the general formula of $CoO_m \cdot nH_2O$, wherein $m$ is from 1.4 to 1.7 and $n$ is from 0.1 to 1 which comprises anode oxidizing a solution of water soluble salt of cobalt, whose discharging potential is not more than 0.7 volt referring to saturated calomel electrode, under current density of not more than 1 ampere/dm.² and from 0.7 to 1.4 volts, said solution having a pH of from 1 to 7.

3. A method according to claim 2, wherein the salts of cobalt are selected from the group consisting of nitrate, sulfate, acetate and fluoborate.

4. A method according to claim 2 wherein the current density is 0.3 ampere/dm.².

5. A method according to claim 2, wherein the concentration of salt of the solution is from 0.001 mol per liter to saturation.

6. A method according to claim 2, wherein the anodic oxidation is conducted at a temperature of from 20° to 80° C.

7. An electrode comprising a base having a coating thereon of cobalt oxide having the general formula of $CoO_m \cdot nH_2O$ wherein $m$ is from 1.4 to 1.7 and $n$ is from 0.1 to 1, and having X-ray analysis values shown in FIG. 2a and further having a pH-potential (normal hydrogen electrode) curve shown by C in FIG. 3.

8. The electrode of claim 7 wherein the base is an electro-conductive substance selected from the group consisting of titanium, tantalum, zirconium, tungsten and lead.

9. The electrode of claim 7 wherein the base material is an electro-conductive substance selected from the group consisting or iron, nickel and cobalt.

10. The electrode of claim 7 wherein the base is graphite.

11. The electrode of claim 7 wherein the base is a material, the surface of which is coated with an electro-conductive substance selected from the group consisting of titanium, tantalum, zirconium, tungsten, lead, nickel, iron and cobalt.

12. The electrode of claim 7 wherein the base is porcelain, the surface of which is coated with an electro-conductive substance selected from the group consisting of titanium, tantalum, zirconium, tungsten, lead, nickel, iron and cobalt.

References Cited

UNITED STATES PATENTS 2,909,408   10/1959   West et al. _____ 23—183

HOWARD S. WILLIAMS, *Primary Examiner.*

D. R. JORDAN, *Assistant Examiner.*

UNITED STATES PATENT OFFICE
CERTIFICATE OF CORRECTION

Patent No. 3,399,966                                September 3, 1968

Osamu Suzuki et al.

It is certified that error appears in the above identified patent and that said Letters Patent are hereby corrected as shown below:

In the heading to the printed specification, line 5, "Trurumi" should read -- Tsurumi --.

Signed and sealed this 10th day of February 1970.

(SEAL)
Attest:

Edward M. Fletcher, Jr.                          WILLIAM E. SCHUYLER, JR.
Attesting Officer                                        Commissioner of Patents